United States Patent
Symons

(10) Patent No.: US 11,864,687 B2
(45) Date of Patent: Jan. 9, 2024

(54) FROTHING DEVICE

(71) Applicant: Dominic Symons, Singapore (SG)

(72) Inventor: Dominic Symons, Singapore (SG)

(*) Notice: Subject to any disclaimer, the term of this patent is extended or adjusted under 35 U.S.C. 154(b) by 577 days.

(21) Appl. No.: 17/179,557

(22) Filed: Feb. 19, 2021

(65) Prior Publication Data

US 2021/0169263 A1 Jun. 10, 2021

Related U.S. Application Data

(63) Continuation-in-part of application No. 16/410,521, filed on May 13, 2019, now abandoned.

(51) Int. Cl.
*A47J 31/44* (2006.01)
*A47J 43/044* (2006.01)
(Continued)

(52) U.S. Cl.
CPC ............ *A47J 31/44* (2013.01); *A47J 36/2483* (2013.01); *A47J 43/044* (2013.01); *A47J 43/082* (2013.01);
(Continued)

(58) Field of Classification Search
CPC ............ B01F 3/04453; B01F 15/00519; B01F 7/162; B01F 7/1695; B01F 7/001; B01F 7/00558; B01F 13/002; B01F 7/0015; B01F 7/00358; B01F 13/0033; B01F 7/225; B01F 5/0693; B01F 15/065; B01F 2015/062; B01F 2215/0006; B01F 23/2351; B01F 27/071; B01F 27/0725; B01F 27/1132; B01F 27/118; B01F 27/808; B01F 27/88;
(Continued)

(56) References Cited

U.S. PATENT DOCUMENTS

| 6,095,677 A * | 8/2000 | Karkos, Jr. ............ A23G 9/224 366/314 |
| 6,231,909 B1 | 5/2001 | Levinson |

(Continued)

FOREIGN PATENT DOCUMENTS

| CA | 3043824 A1 * | 4/2020 | ............ A47J 31/20 |
| EP | 1656866 A1 * | 5/2006 | ............ A47J 27/004 |

OTHER PUBLICATIONS https://www.amazon.com/PowerLix-COMPLETE-Cappuccino-Chocolate-Stainless/dp/B06X6JLZ1T?re _=bl_dp_s_web_ 15988591011; printed May 2, 2019 (11 pages).

(Continued)

*Primary Examiner* — Charles Cooley
(74) *Attorney, Agent, or Firm* — Todd R. Miller

(57) ABSTRACT

A device for frothing milk preferably includes a rotatable impeller and a screen disposed about the bottom of the impeller downstream of milk being pushed by the impeller. The frothing device may further include a pitcher and a base upon which the pitcher sits wherein the base includes a heater. The pitcher includes a magnetic drive capable of turning the impeller at very high speeds. The impeller is positioned off-center within the pitcher that preferably includes a tapered interior. The structure of the device and programs that adjust the speed of rotation of the impeller permit the user to create bubbles and further break the bubbles down into a silky smooth microfoam without the conventional use of a steam wand or other such device and without the skills of a professional barista.

14 Claims, 19 Drawing Sheets

(51) Int. Cl.
*A47J 43/08* (2006.01)
*A47J 36/24* (2006.01)
*B01F 33/453* (2022.01)

(52) U.S. Cl.
CPC . *B01F 33/4537* (2022.01); *A47J 2043/04454* (2013.01)

(58) Field of Classification Search
CPC .............. B01F 33/4534; B01F 33/4535; B01F 33/5011; B01F 33/5014; A23C 9/1524; A23C 2210/30; A47J 31/44; A47J 36/2483; A47J 43/044; A47J 43/082; A47J 2043/04454; A47J 43/0465; A47J 43/1087; A47J 2043/04427
See application file for complete search history.

(56) References Cited

U.S. PATENT DOCUMENTS

| | | | |
|---|---|---|---|
| 6,283,625 B2 | 9/2001 | Frankel | |
| 7,566,164 B2 * | 7/2009 | Zarom | B01F 27/073 366/289 |
| D607,686 S | 1/2010 | Elissen | |
| D613,988 S | 4/2010 | Lane | |
| D630,467 S | 1/2011 | Harrod | |
| D646,522 S | 10/2011 | Collinson | |
| D655,568 S | 3/2012 | Chapman | |
| D703,479 S | 4/2014 | Norland | |
| 8,688,277 B2 | 4/2014 | Studor | |
| D799,913 S | 10/2017 | Ryan | |
| 9,801,500 B2 * | 10/2017 | Ven Der Woning | A47J 27/004 |
| 10,034,572 B2 | 7/2018 | Caruso | |
| 2012/0017778 A1 * | 1/2012 | Elissen | A47J 27/004 99/453 |
| 2016/0213192 A1 | 7/2016 | Caruso | |
| 2016/0227960 A1 | 8/2016 | DellaContrada | |
| 2020/0360874 A1 * | 11/2020 | Symons | B01F 27/071 |
| 2021/0169263 A1 * | 6/2021 | Symons | A47J 43/1087 |

OTHER PUBLICATIONS https://www.amazon.com/Aerolatte-Handheld-Frother-Stand-Black/dp/B0...vzzt6wgi[i]ktfy7t[d]D[z]m[t]w[r]google.com&tag=thestrategistsite-20, printed May 2, 2019 (10 pages).
https://www.amazon.com/Secura-Automatic-Electric-Frother-Warmer/dp/B00JEPP64C?ascsubtag=[]st[p]cjngbl25c0079egy6vzzt6wgi[i]T9fGkV[d]D[z]m[t]w[r]google.com&tag=thestrategistsite-20, printed May 2, 2019 (10 pages).
https://www.amazon.com/Nespresso-3694-US-BK-Aeroccino3-Frother-Black/dp/B06XHWQJKN?ascsubtag=[]st[p]cjngbl25c0079egy6vzzt6wgi[i]lmfKKO[d]D[z]m[t]w[r]google.com&tag-thestrategistsite-20, printed May 2, 2019 (8 pages).
https://www.amazon.com/Bodum-Latteo-Frother-Glass-Handle/dp/B00E99MM18/?ascsubtag=[]st[p]cjngbl25c0079egy6vzzt6wgi[]gPOB3X[d]D[z]m[t]w[r]google.com&tag=thestrategistsite-20, printed May 2, 2019 (9 pages).
https://www.amazon.com/gp/product/B000X7GF40?ascsubtag=[]st[p]cjngbl25c0079egy6vzzt6wgi[i]fBT2xv[d]D[z]m[t]w[r]google.com&tag=thestrategistsite-20, printed May 2, 2019 (7 pages).
https://www.amazon.com/Mr-Coffee-Barista-Espresso-Cappuccino/dp/B007K9OIMU/?ascsubtag=[]st[p]cjngbl25c0079egy6vzzt6wgi[i]UWpB9f[d]D[z]m[t]w[r]google.com&tag=thestrategistsite-20, printed May 2, 2019 (9 pages).
http:/nymag.com/strategist/article/best-milk-frothers.html, printed May 2, 2019 (8 pages).
https://www.thesecura.com/product/secura-mmf-902-magnetic-automatic-electric-milk-frother-warmer/, printed Feb. 16, 2021 (2 pages).

* cited by examiner

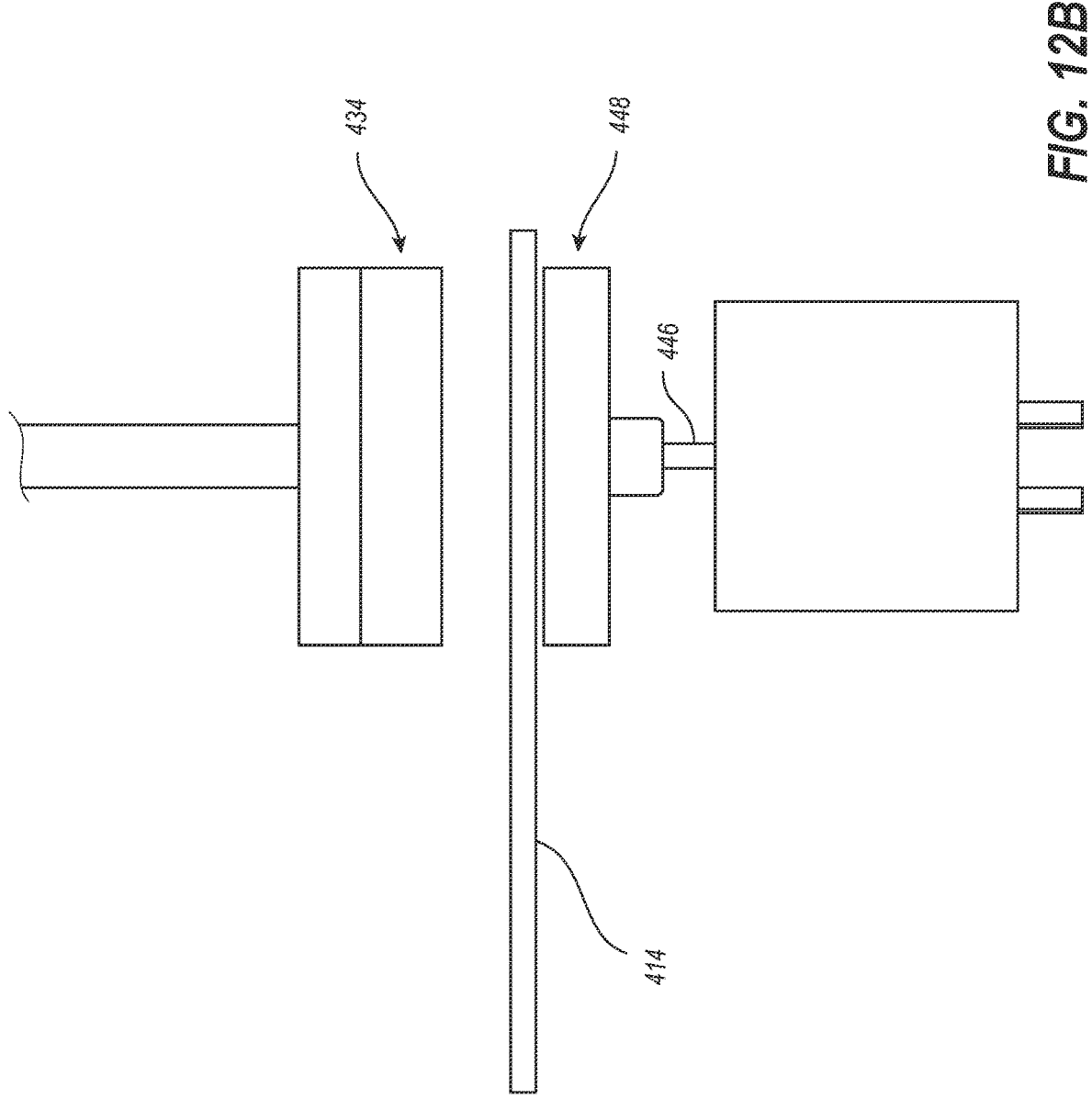

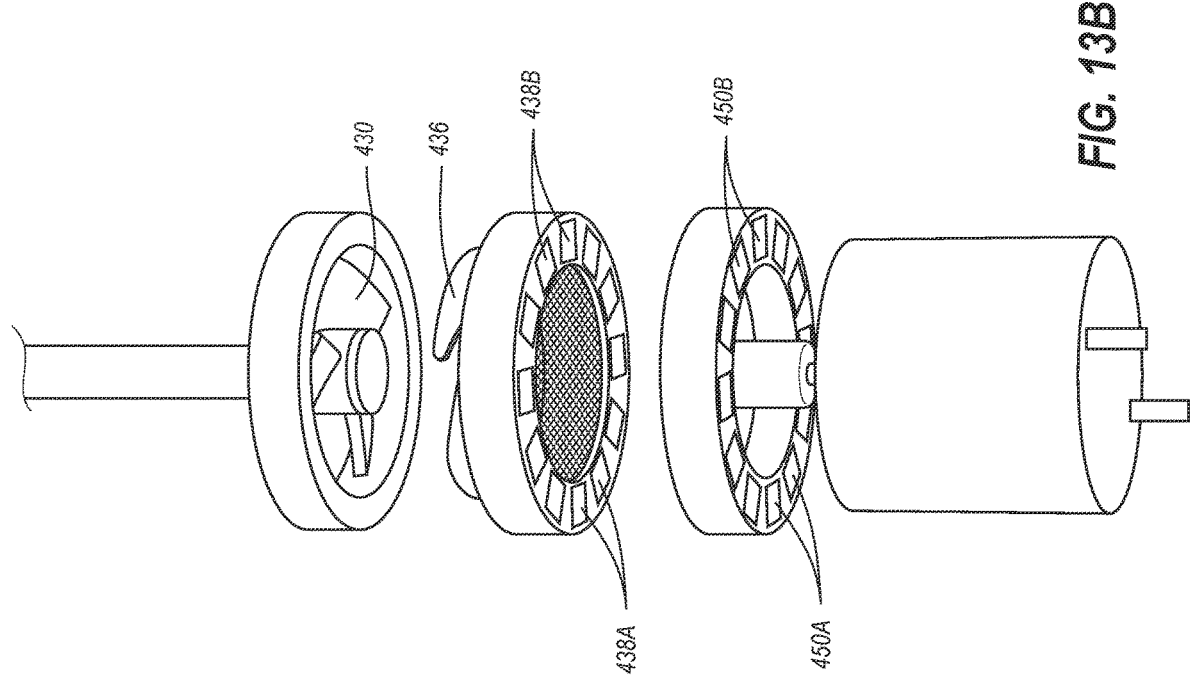
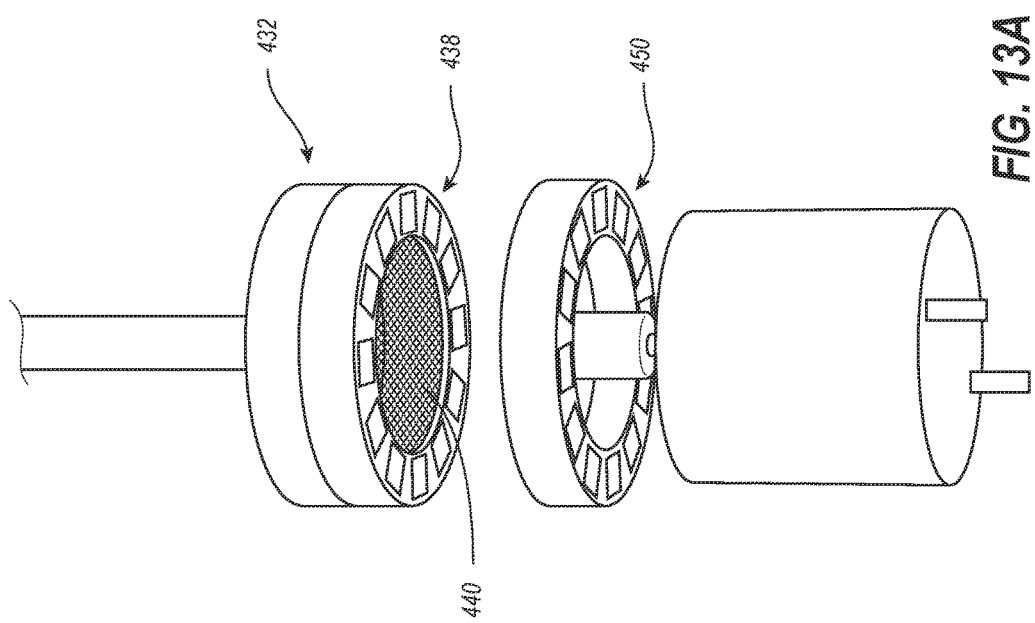
FIG. 13A
FIG. 13B

FROTHING DEVICE

CROSS-REFERENCE TO RELATED APPLICATION

The present application is a continuation-in-part of U.S. patent application Ser. No. 16/410,521 filed on May 13, 2019, which is incorporated by reference as if fully set forth herein.

BACKGROUND

The present disclosure relates generally to a mechanism for preparing milk for espresso or cocoa-based drinks such as cappuccinos, cafe lattes, and mochas.

SUMMARY

One exemplary embodiment of the disclosed subject matter is a frothing device preferably having a handle, a rotatable shaft coupled to the handle, an impeller rotatable by the shaft, and a screen disposed about the impeller opposite the handle. The frothing device may further include a holder disposed about the impeller and the screen. The screen is preferably annular in shape. The shaft may be integral to the impeller but preferably is coupled via a threaded arrangement.

In another exemplary embodiment, the frothing device includes a rotatable shaft, an impeller rotatable by the shaft, and a screen disposed about the bottom of the impeller downstream of the flow of fluid being pushed by the impeller. This frothing device may also have a handle coupled to the rotatable shaft. A holder may be disposed about the impeller and the screen.

In the alternative to the handle arrangement, the frothing device may include a pitcher having a bottom wall, wherein the rotatable shaft extends upward from the bottom wall of the pitcher. With this configuration, the impeller preferably includes a channel configured to receive the rotatable shaft. Moreover, the frothing device may include a housing having a heater and a nub extending upwardly from the housing. The shaft has an opening at its bottom, wherein the opening of the shaft is configured to receive the nub. A holder is preferably disposed about the impeller and the screen, wherein the screen has a hole configured to receive the impeller.

Another exemplary embodiment of the disclosed subject matter is a method of frothing comprising creating a vortex in milk using a frothing device, wherein the frothing device includes a rotatable shaft, an impeller rotatable by the shaft, and a screen disposed about the bottom of the impeller downstream of the flow of fluid being pushed by the impeller. The vortex is then stopped, either by moving the impeller away from the center or by slowing down the rotation of the impeller, wherein the milk is churned until microfoam is generated. The rotatable shaft may be coupled to a handle. In the alternative, the frothing device may include a pitcher, wherein the rotatable shaft is disposed about the bottom wall of the pitcher. The pitcher is disposed about the housing having a heater and a nub extending from the housing, wherein the rotatable shaft is configured to receive the nub. A holder may be disposed about the impeller and the screen.

In another exemplary embodiment, the frothing device includes a pitcher comprised of a body having a top and an opposing bottom and an inner bowl. The inner bowl has a bottom wall disposed between the top and bottom of the pitcher body, wherein the inner bowl defines a liquid compartment and an electrical compartment within the interior of the pitcher. A lid is disposed about the top of the pitcher body. A shaft extends downward from the lid in a position offset from a central location of the lid. An impeller is disposed about a bottom end of the shaft wherein the impeller has blades and a holder disposed about the blades. A first ring is disposed about the impeller opposite the shaft. The first ring includes a first set of magnets and a screen contained by the first ring. A second ring is contained within the electrical compartment and disposed opposite the first ring. The second ring includes a second set of magnets corresponding to the combination of magnets within the first ring. A variable high speed motor rotates the second ring at different rates of speed, causing the impeller to rotate and create microfoam from milk poured into the liquid compartment of the pitcher. The pitcher sits upon a base, which provides electricity to the pitcher. The base also includes a heater for heating the milk.

The first set of magnets includes pairs of positive polarity magnets disposed next to pairs of negative polarity magnets. The second set of magnets includes pairs of positive polarity magnets disposed next to pairs of negative polarity magnets. The inner bowl preferably has tapered sides. The first ring is removably attachable to the holder via a tongue and groove arrangement.

In another exemplary embodiment, the frothing device includes a pitcher having a liquid compartment and an electrical compartment. A rotatable impeller is contained within the liquid compartment, wherein the impeller includes blades and a holder disposed about the blades. A first ring is removably coupled to the impeller wherein the first ring has a first set of magnets of positive polarity and negative polarity. The first ring further includes a screen disposed adjacent to the electrical compartment. A rotatable second ring is contained within the electrical compartment and disposed opposite the first ring. The second ring has a second set of magnets of positive and negative polarity. A rotatable shaft is disposed about a bottom of the liquid compartment offset from center, wherein the impeller is disposed about one end of the rotatable shaft. The impeller is capable of being rotated at various speeds and up to 7,000 RPM to create desired microfoam.

BRIEF DESCRIPTION OF THE DRAWINGS

Some non-limiting exemplary embodiments of the disclosed subject matter are illustrated in the following drawings. Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described. Dimensions of components and features shown in the figures are chosen for convenience or clarity of presentation. For convenience or clarity, some elements or structures are not shown or shown only partially and/or with different perspective or from different point of views.

FIGS. 12A-13A are detailed views of certain aspects of the device seen in FIG. 11A;

FIG. 13B is a perspective, sectional view of aspects of the device seen in FIG. 13B;

DETAILED DESCRIPTION

The preparation of quality silky textured milk for a cappuccino that allows a barista to create elegant patterns on the drink known as "latte art" is commonly seen in coffee shops. Such shops use large commercial espresso machines containing multiple water boilers, one of which is dedicated to creating scalding and high pressured steam. This steam is pushed through a steam wand at high velocity to heat the milk and create foam. A knowledgeable barista may further break down the bubbles in the foam to create even smaller bubbles, which may be referred to as microfoam. Microfoamed milk mixes with the espresso when being poured and adds a nice perceived sweetness to the final drink.

While it is possible for the home barista to create foam using an espresso machine having a steam boiler and wand, it is quite a different feat to create silky microfoam textured milk suitable for creating latte art. The typical home machine is just not as stout as the commercial machines found in coffee shops. Furthermore, many small home espresso machines do not include a second boiler or steam wand at all and only produce espresso, leaving the user unable to create any kind of microfoam milk. In an attempt to supplement these deficiencies, frothing devices have been designed for home use. Such devices usually employ a small whisk to create ordinarily sized bubbles, resulting in the milk almost immediately separating and having a thick foam texture on top with milk at the bottom. When poured, the milk will come out first followed by a blob of foam or "dry foam." This dry foam blob does not mix well with the espresso drink, creates a separation of flavors with frothy milk on top and espresso on the bottom, and does not permit the desirable latte art. Moreover, for many people, this dry foam is very undesirable as it does not have that extra perceived sweetness and makes a drink that is very different to what is produced by a professional barista.

Accordingly, a frothing device solving these and other problems is desired.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

Figure 1:
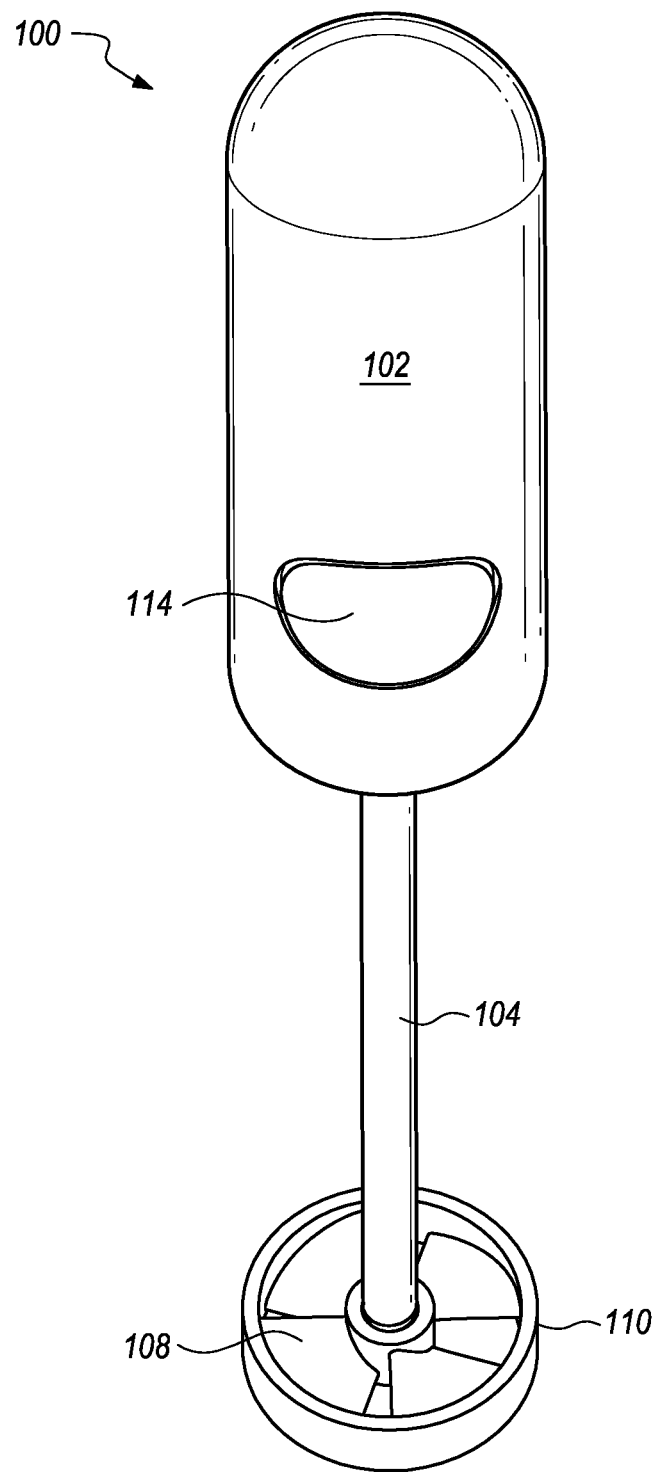
FIG. 1 is a perspective view of an exemplary embodiment disclosed herein.

FIGS. 1-4 illustrate one such exemplary embodiment of novel frothing device 100 disclosed herein. As seen in FIG. 1, the device 100 preferably includes a handle 102 coupled to a rotatable shaft 104. The shaft 104 is in turn coupled to an impeller 106 having blades 108. The blades 108 may be of varying dimensions and shapes depending on the amount of thrust desired to be created, as discussed below.

Figure 2:
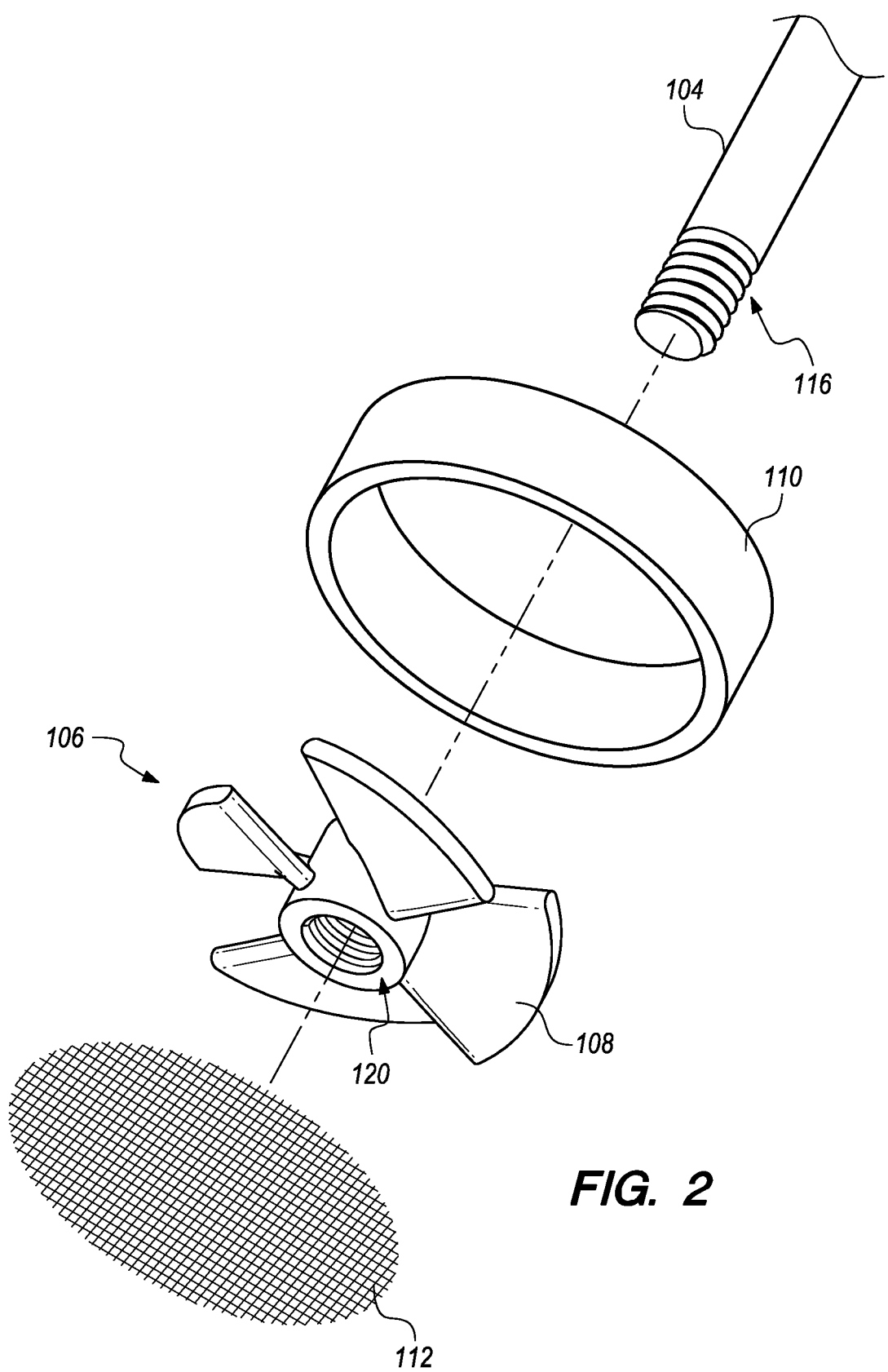
FIG. 2 is an exploded view of certain aspects of the embodiment shown in FIG. 1.

As best seen in FIG. 2, a mesh screen 112 is disposed about the impeller 106 opposite the shaft 104. The sizes of the holes within screen 112 may also be of varying dimensions and shapes depending on how large or fine the user desires the final bubble sizes to be in the resultant microfoam. The screen 112 may be coupled to the impeller 106 such as via welding, co-injecting, or some arrangement less permanent. Preferably, however, the screen 112 is disposed about the impeller 106 by way of a holder 110.

FIG. 2 illustrates the holder 110 may be annular in shape, wherein both the screen 112 and impeller 106 are constrained and held in place by holder 110 for added support and rigidity of the overall device 100.

FIG. 2 also illustrates the shaft 104 is preferably coupled to the impeller 106 via a thread and groove arrangement. In particular, shaft 104 may have threads 116 configured to engage grooves 120 cut into a channel of the impeller 106.

Turning back to FIG. 1, the frothing device 100 preferably includes a switch 114 in the handle 102. The switch 114 is in electrical communication with circuitry and a power supply such as one or more batteries. The switch 114 permits the device 100 to be powered on or off, and also preferably permits the shaft 104 to be rotated at varying speeds.

Figure 3B:
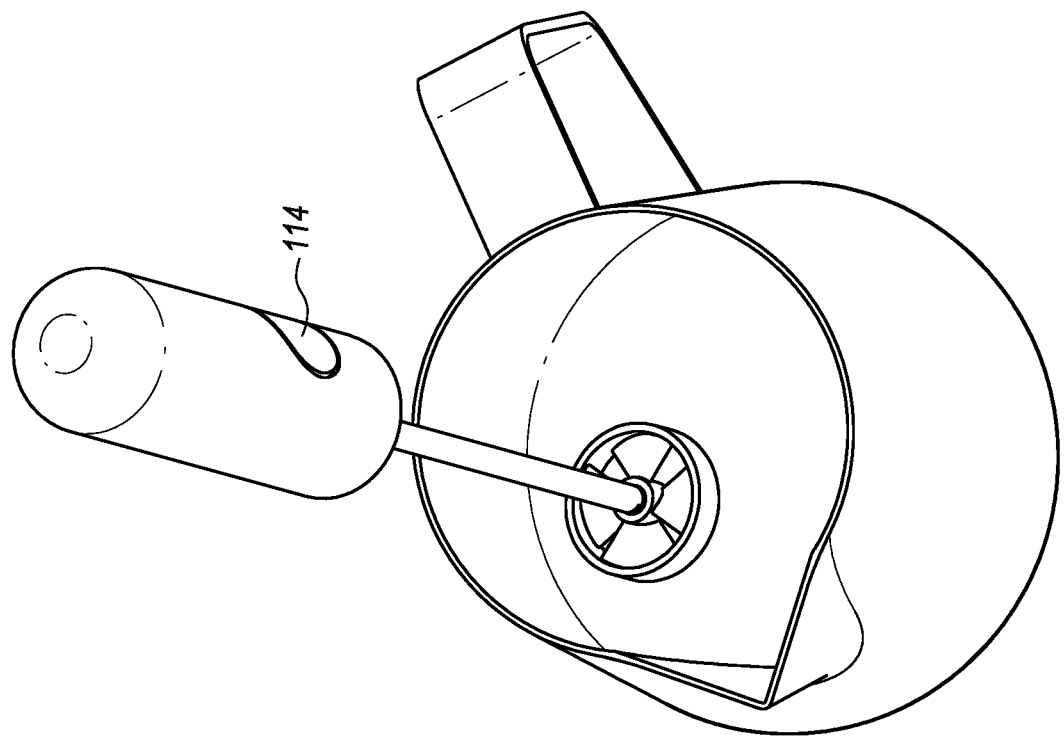
FIGS. 3A-3B are perspective views showing exemplary use of the embodiment seen in FIG. 1.
Figure 3A:
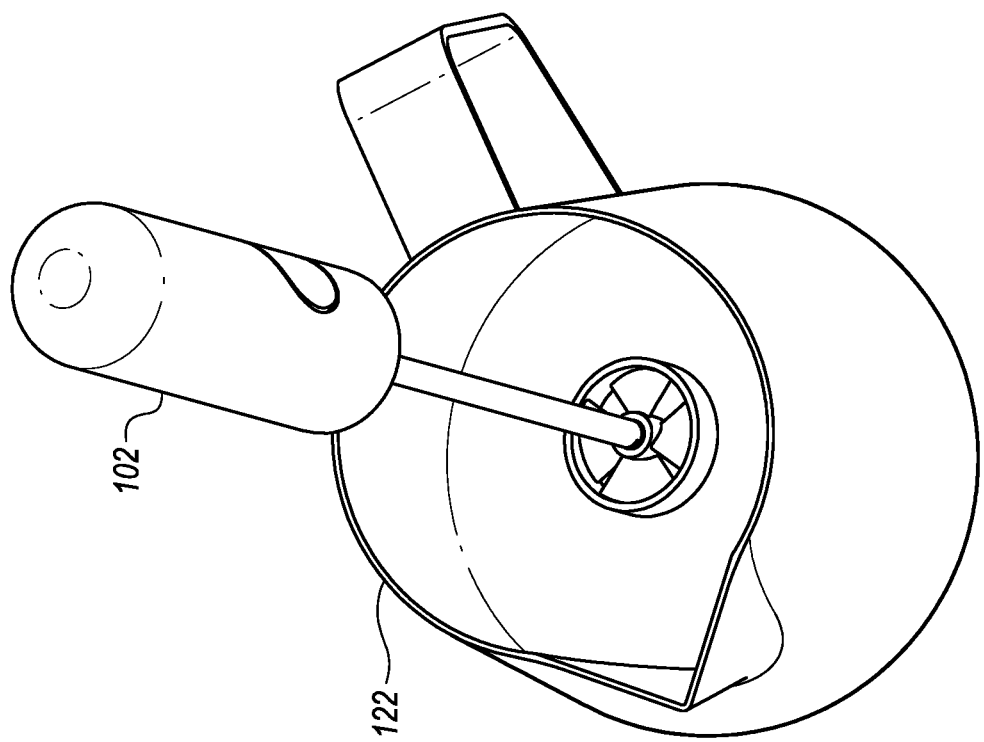
Figure 4:
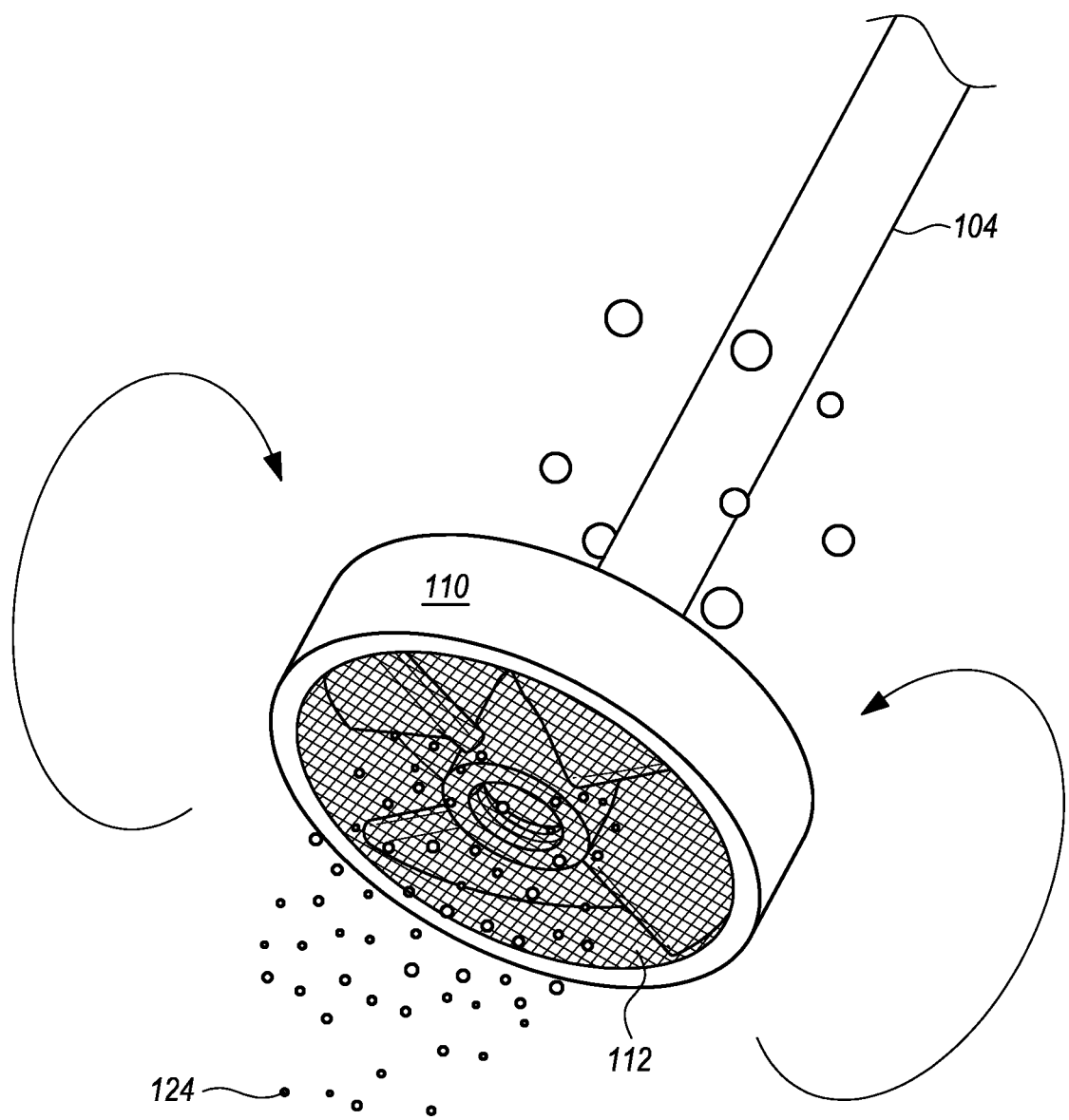
FIG. 4 is a perspective view of certain aspects of the embodiment shown in FIG. 1 in use.
Figure 5A:
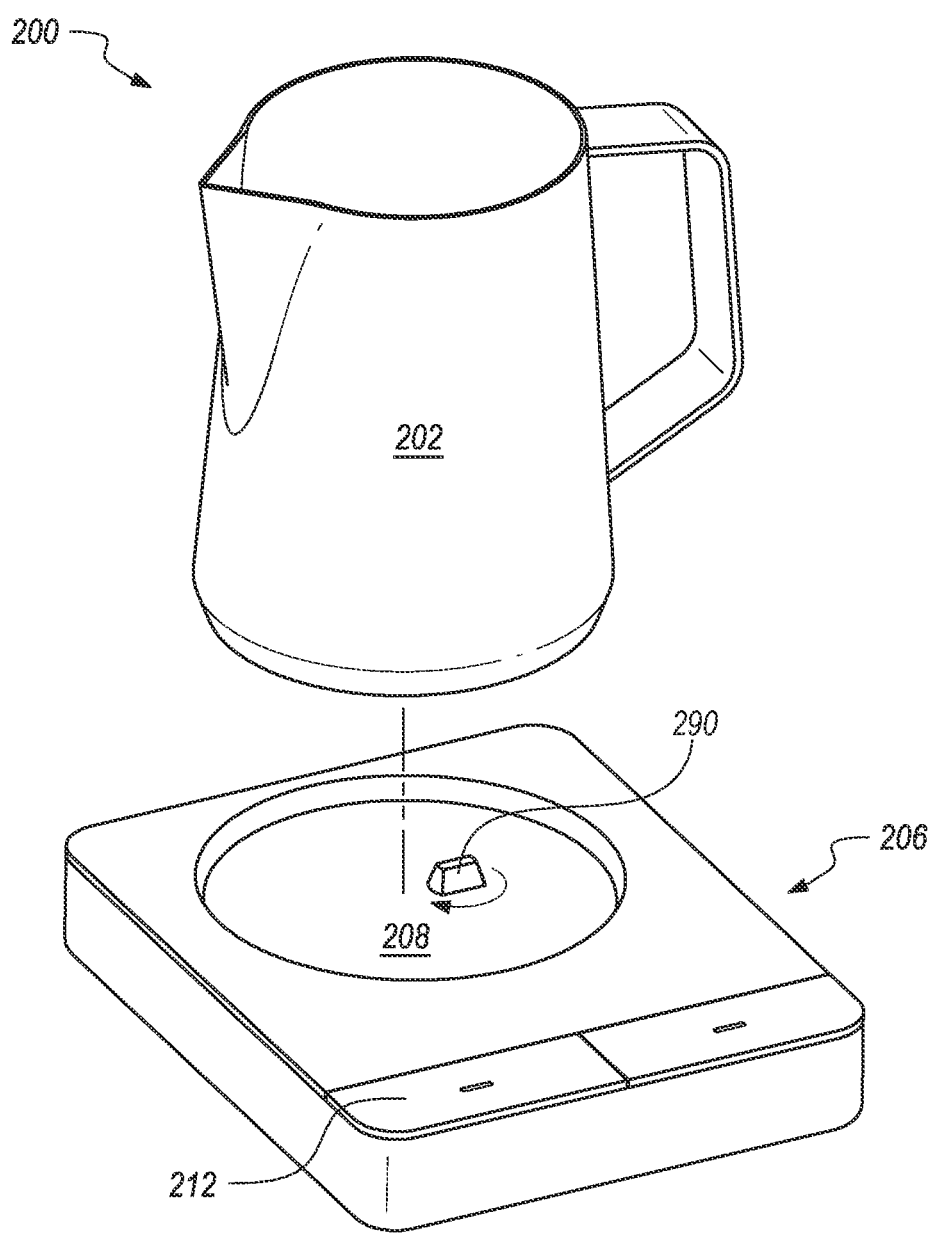
FIGS. 5A-6B are perspective views of another exemplary embodiment disclosed herein.
Figure 5B:
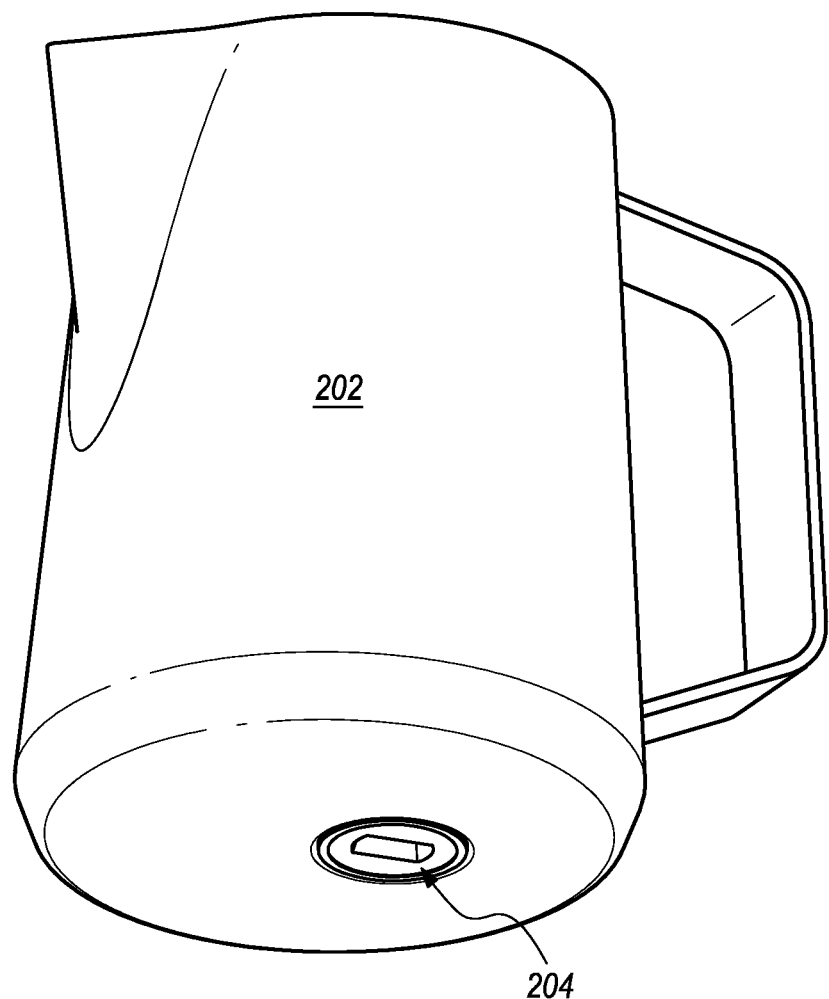

In operation, device 100 is operated by placing hot or cold milk into a pitcher 122 or container and submerging the impeller 106 and screen 112 into the milk near the center, as illustrated by FIG. 3A. The user may then toggle switch 114 to rotate shaft 104. Doing so will cause the impeller 106 and screen 112 to rotate rapidly inside the milk to create a vortex. The vortex in turn mixes ambient air with the milk to make bubbles and foam. When the device 100 is moved further off-center (as seen in FIG. 3B), the vortex ceases, and the impeller 106 becomes entirely submerged. No longer contacting ambient air and no longer producing new foam bubbles, the impeller 106 now only churns the milk and pulls the foam down where it is pushed through the impeller 106 and screen 112. The foam bubbles are thus broken down into microscopic bubbles 124 as they are forced through the screen 112 repeatedly, as best seen in FIG. 4. The result is a silky smooth microfoamed milk for pouring over espresso or the like and creating latte art if desired.

Thus, it is the particular configuration of the screen 112 disposed below the impeller 106, i.e., downstream of the flow, that creates the microfoam rather than the use of steam or a whisk. Moreover, it is worth noting that such a configuration is counter-intuitive and/or opposite to what may be thought of as a conventional filter and impeller arrangement. In other words, screens or filters would typically be disposed above the impeller, i.e., upstream of the flow, to filter out unwanted material from passing into the impeller and thus irreparably damaging it. However, with the disclosed embodiments, the screen 112 is downstream of the flow—not for the purpose of filtering out any undesirable material—but rather for breaking down bubbles in the flow to create the desirable microfoam.

FIGS. 5A-7C illustrate another embodiment of the disclosed subject matter. As seen therein, the frothing device 200 preferably comprises a pitcher 202 disposed about a housing 206. The pitcher 202 includes a rotatable shaft 204 disposed about the bottom wall of the pitcher 202, as best seen in FIG. 5B. The shaft 204 includes a channel configured to receive a rotatable nub 290 disposed about the top wall of the housing 206.

Figure 6B:
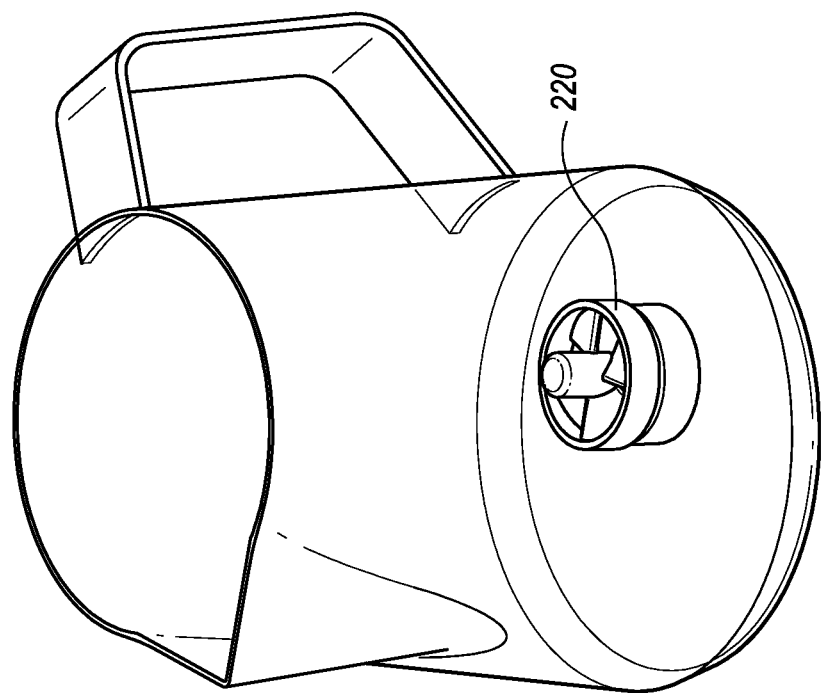
Figure 6A:
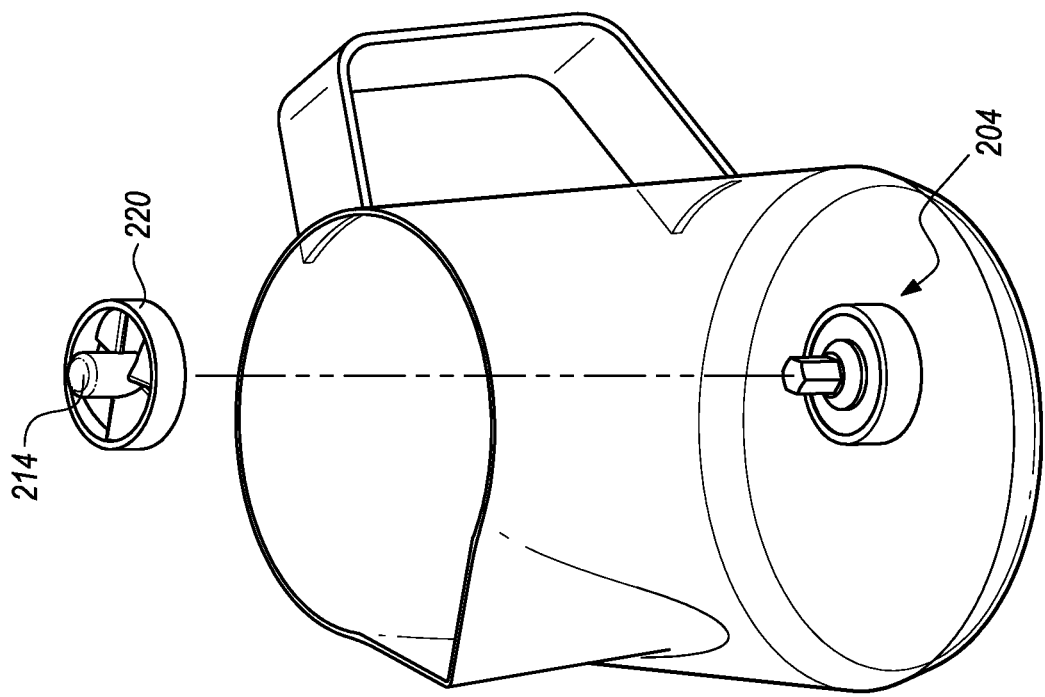
Figure 7A:
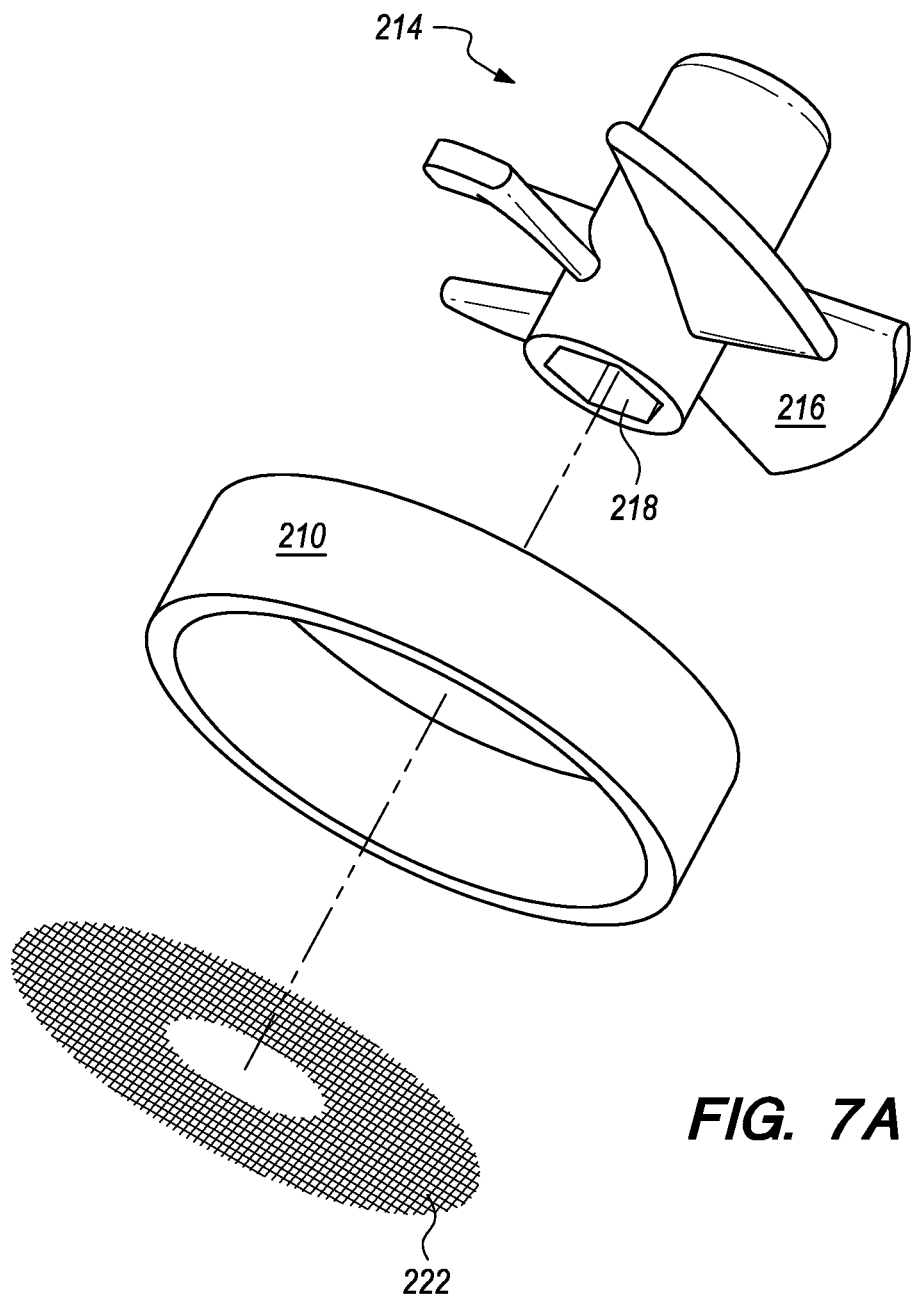
FIG. 7A is an exploded view of certain aspects of the embodiment shown in FIGS. 5A-6B.

The device 200 further includes an impeller 214 having blades 216 of varying dimensions and shapes depending on user preference, as discussed above in the context of FIGS. 1-4. The impeller 214 is configured to engage the rotatable shaft 204, as illustrated in FIGS. 6A-6B. FIG. 7A illustrates an exploded view of an exemplary engagement obtained by a channel 218 cut into the impeller 214 for receiving the rotatable shaft 204. Instead of this configuration, the device 200 may use a magnetic spinning arrangement to turn the impeller 214.

FIG. 7A also shows the use of a screen 222 disposed about the impeller 214 in a downstream arrangement as discussed above. Stated differently, the impeller 214 is rotatable by the shaft 204, wherein the impeller 214 has a top and an opposing bottom. The impeller 214 is configured to move fluid from the top to the bottom of the impeller 214, wherein the screen 222 is disposed about the bottom of the impeller 214.

Figure 7B:
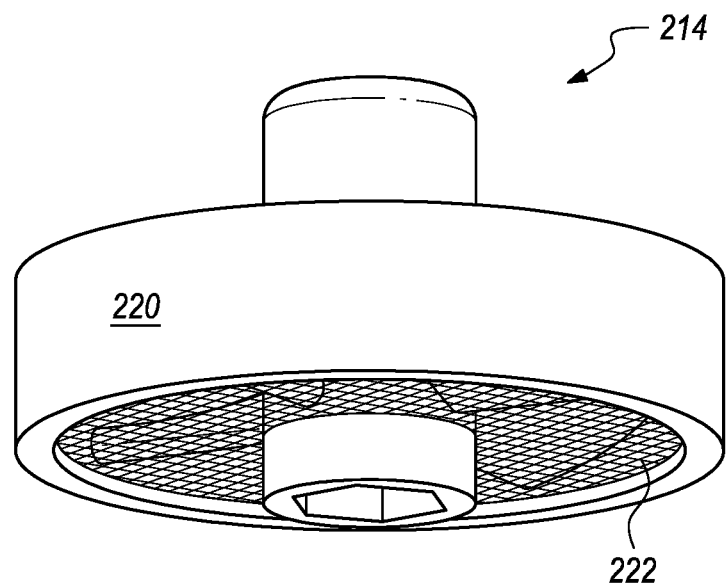
FIGS. 7B-7C are perspective views of certain aspects of the embodiment shown in FIGS. 5A-6B.
Figure 7C:
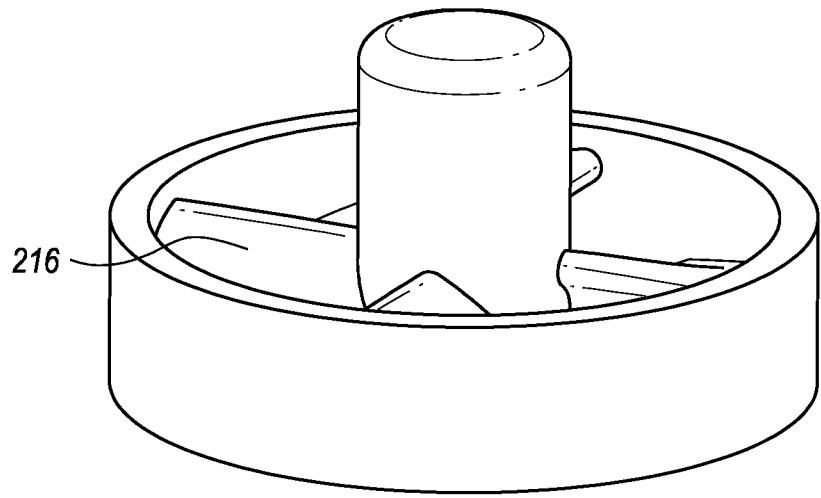

The screen 222 may be permanently attached to impeller 214 or removable as discussed above. Moreover, an optional holder 210 may partially encapsulate the impeller 214 and screen 222, the latter of which preferably has a cut-out centrally located therein to receive the bottom portion of the rotatable impeller 214, as best seen in FIGS. 7A-7C.

Referring again to FIG. 5A, the housing 206 preferably includes a heater 208 for heating milk in pitcher 202. Switches 212 are disposed about the housing 206. The switches 212 are in electrical communication with a power supply such one or more batteries. The switches 212 may be engaged by the user to turn on device 200, causing heater 208 to heat up and rotating shaft 204 to spin impeller 214. The user may use the switches 212 to vary the speed of the impeller and thus the speed at which milk flows from the top of the pitcher 202, through the blades 216, and then the screen 222 downstream of the flow. Doing so permits the user to create a vortex and aerate the milk or to churn and create microfoam.

Figure 8B:
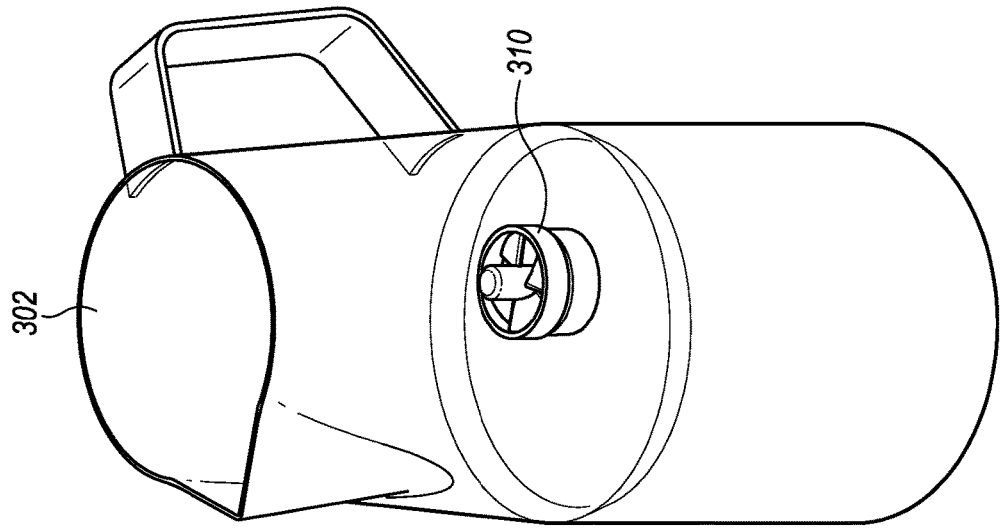
FIGS. 8A-8B are perspective views of another exemplary embodiment disclosed herein.
Figure 8A:
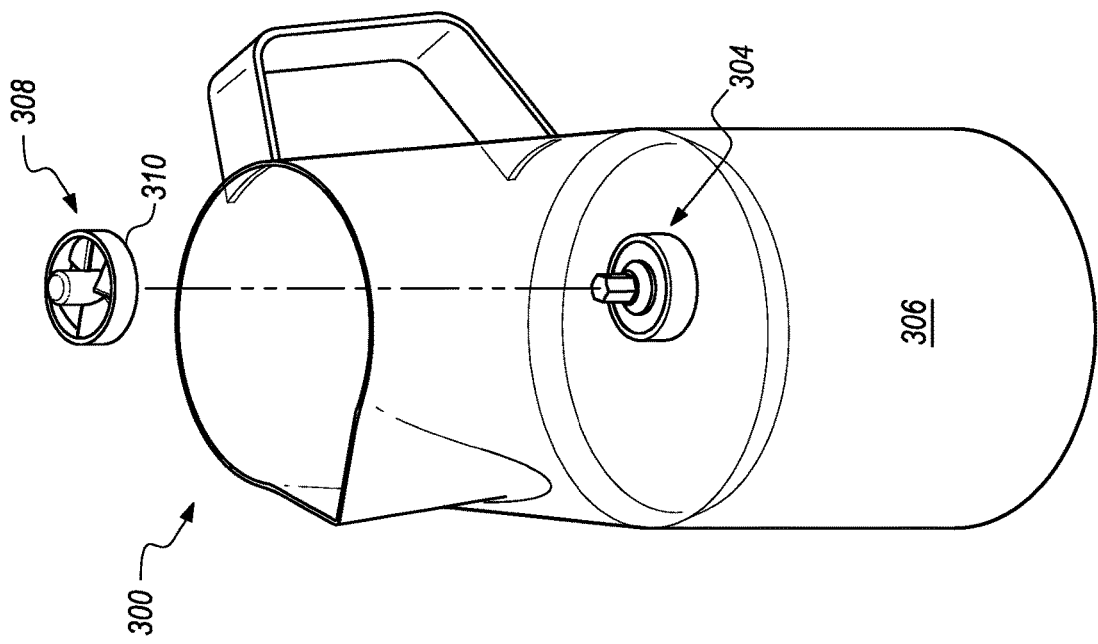
Figure 9:
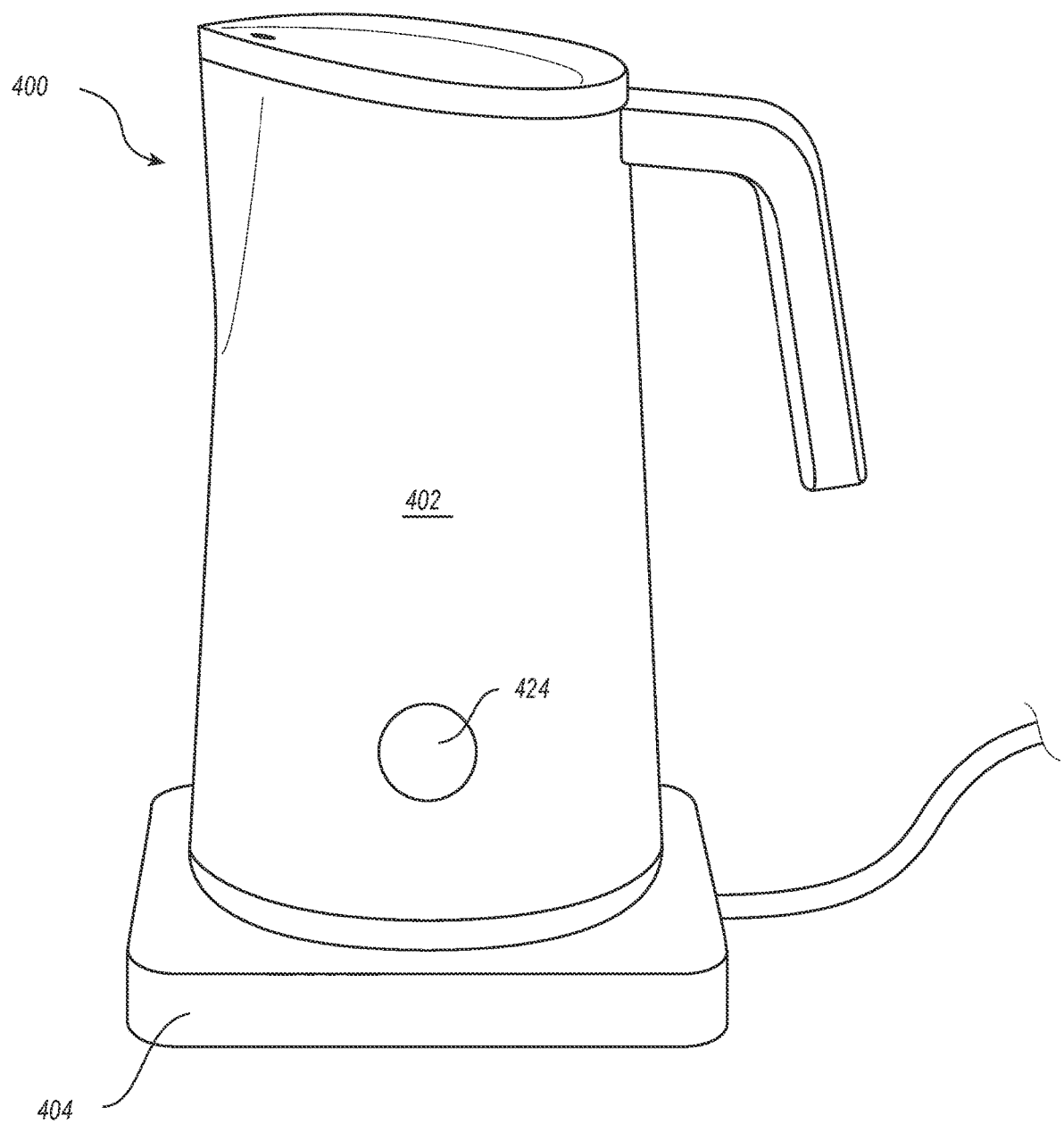
FIG. 9 is a perspective view of another exemplary embodiment disclosed herein.

FIGS. 8A-8B illustrate another embodiment of the disclosed subject matter. Here, the frothing device 300 may include a pitcher 302 containing a waterproof rotatable shaft 304 disposed about the bottom of the pitcher 302. An impeller 308, screen, and holder 310 arrangement similar to that illustrated in FIGS. 5A-7C may be connected to this shaft 304 from inside the pitcher 302. Doing so positions the impeller 308 and screen component near the bottom of the pitcher 302 and preferably slightly off-center. The device 300 also preferably includes a housing 306 having a hot plate with a motorized rotating nub. The nub is positioned to couple with the shaft 304 when the pitcher 302 is placed on the hot plate. When turned on, the hot plate heats the pitcher 302 to warm the milk and rotate the nub and blend the milk. Accelerating the impeller 308 and screen sufficiently will create a vortex in the milk while decelerating will stop the vortex and churn the milk to create the desired microfoam, as discussed above.

FIGS. 9-13B illustrate another exemplary embodiment of novel frothing device 400 disclosed herein. Here, frothing device 400 includes a pitcher 402 disposed on top of a base 404. The pitcher 402 includes a generally cylindrical body 406 having a top end 408 and an opposing bottom end 410. A generally tapered inner bowl 412 defined by side walls and a bottom wall 414 separates the interior of pitcher 402 into a liquid compartment 416 and an opposing electrical compartment 418. The tapering of the inner bowl 412 is defined by the side walls that extend inward and inclined to the body 406. The pitcher 402 preferably includes a handle 420 attached about the top end 408. A removable lid 422 is also disposed about the top end 408. The pitcher 402 includes an on/off button 424 with status indicator lighting showing what program the device 400 is running. Base 404 contains electrical components 426 including a heater for heating up the milk.

The body 406 of pitcher 402 is preferably made of painted stainless steel with the bottom of the pitcher 402 made of plastic to aid in cleaning. The lid 422 is preferably made of clear polycarbonate with a rubber seal. The handle 420 is preferably made of a strong, phenolic resin. The on/off button 452 is preferably a capacitive touch switch. The inner bowl 412 is preferably soldered or the like to the interior of the body of pitcher 402 so there cannot be any leaks to the electrical components in the liquid compartment 416.

Figure 10:
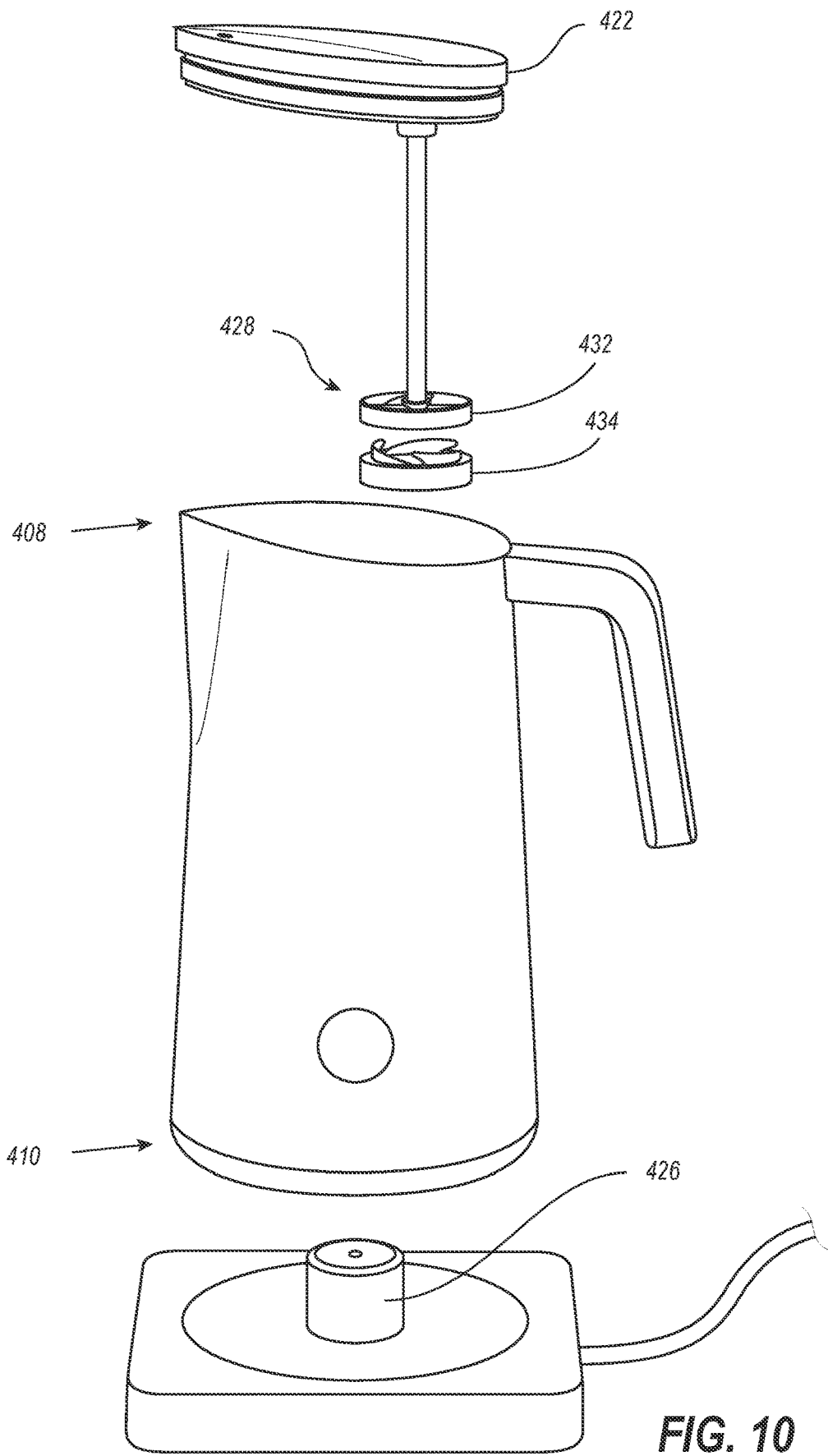
FIG. 10 is an exploded view of certain aspects of the embodiment shown in FIG. 9.
Figure 11A:
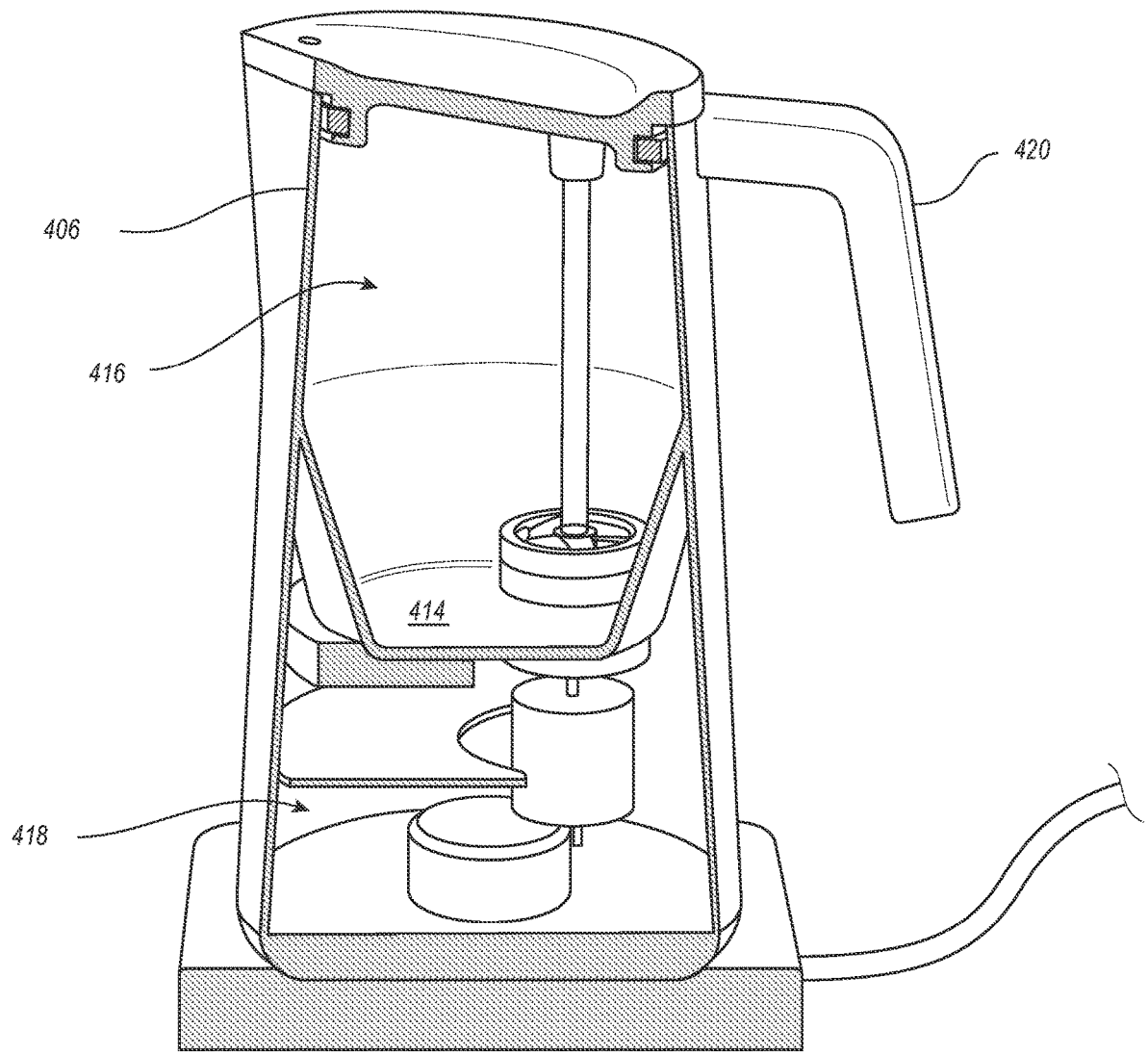
FIG. 11A is a perspective, sectional view of the embodiment shown in FIG. 9.
Figure 11B:
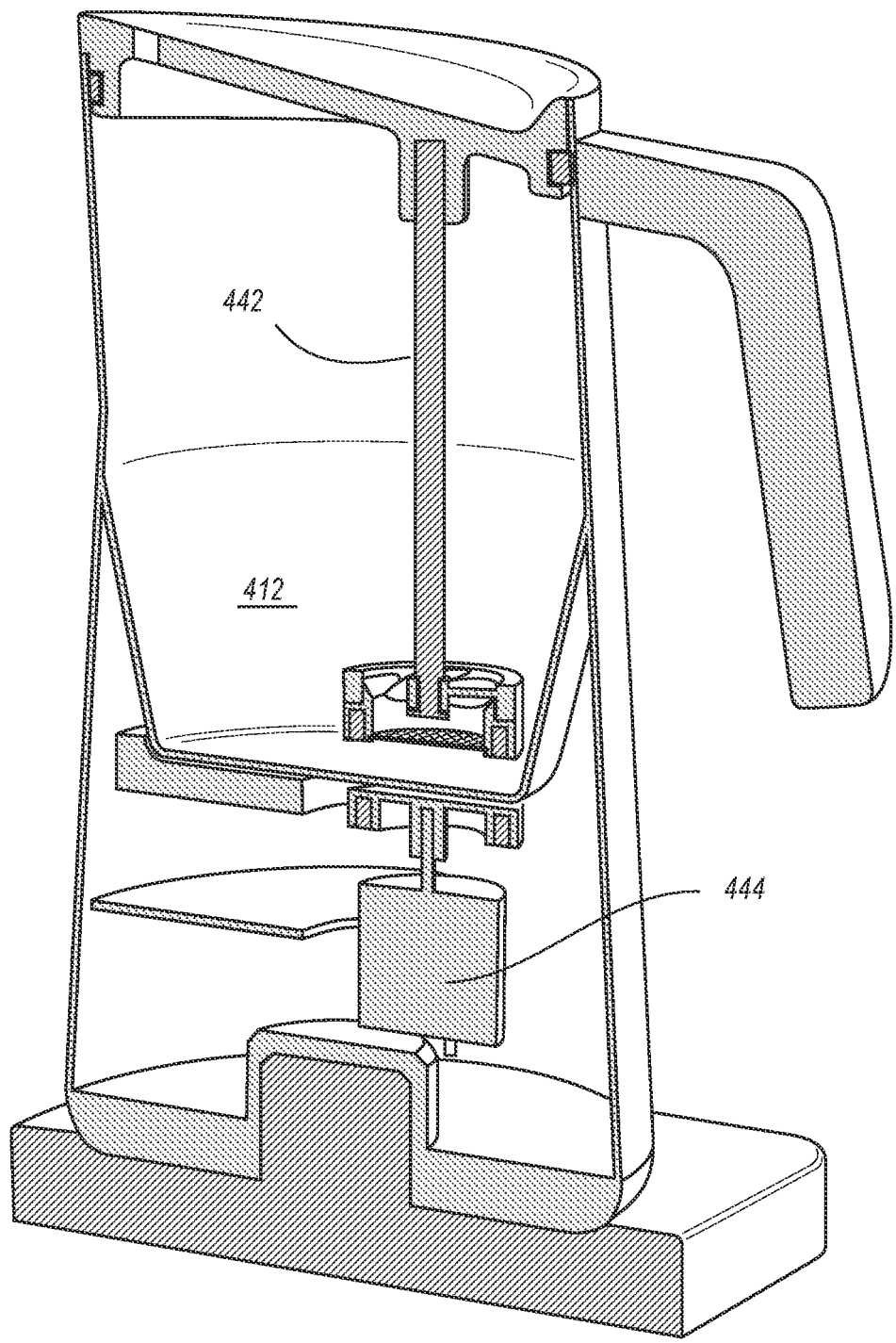
FIG. 11B is a cut-away view of certain aspects of the device seen in FIG. 11A.
Figure 12A:
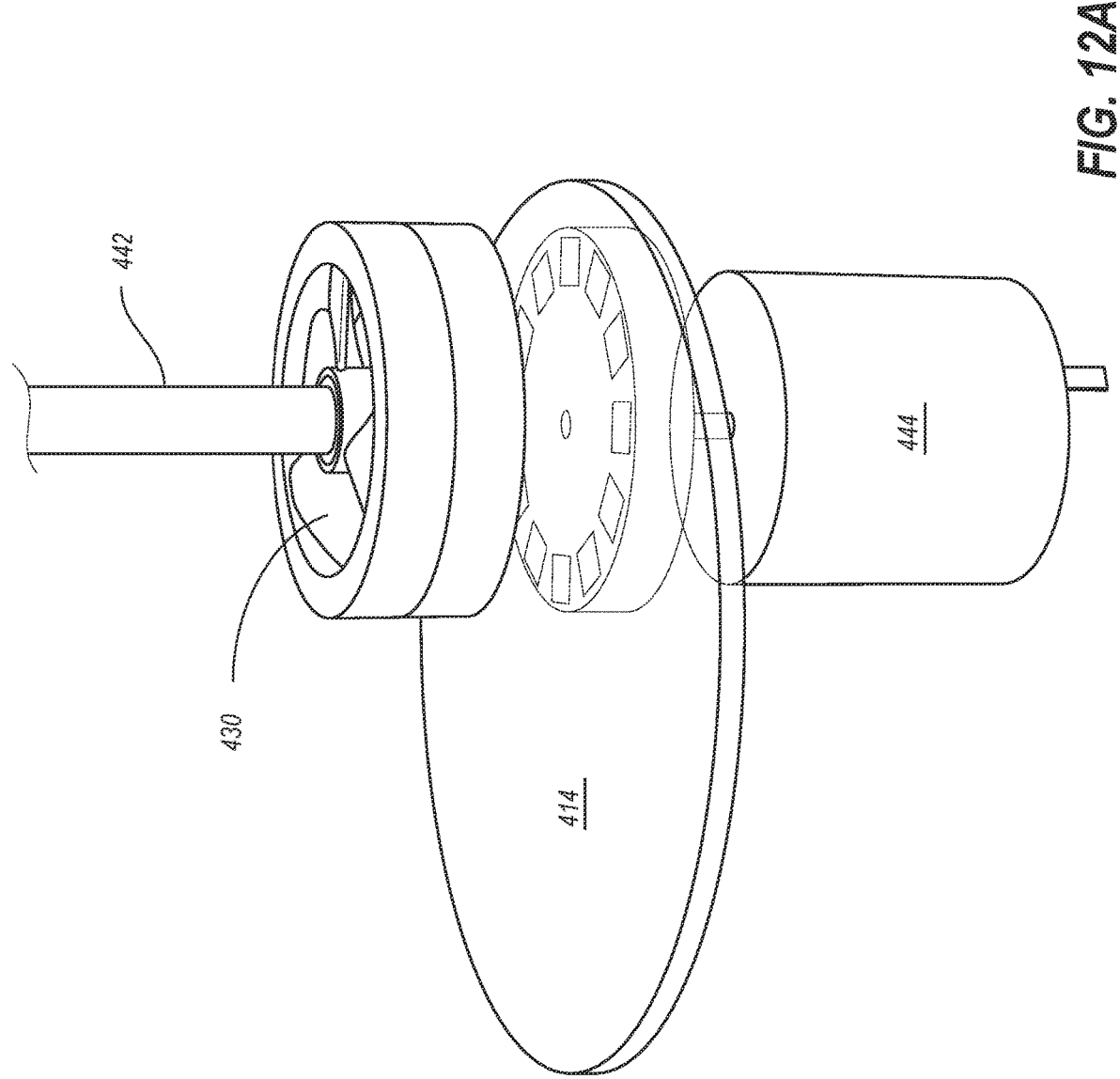
Figure 14:
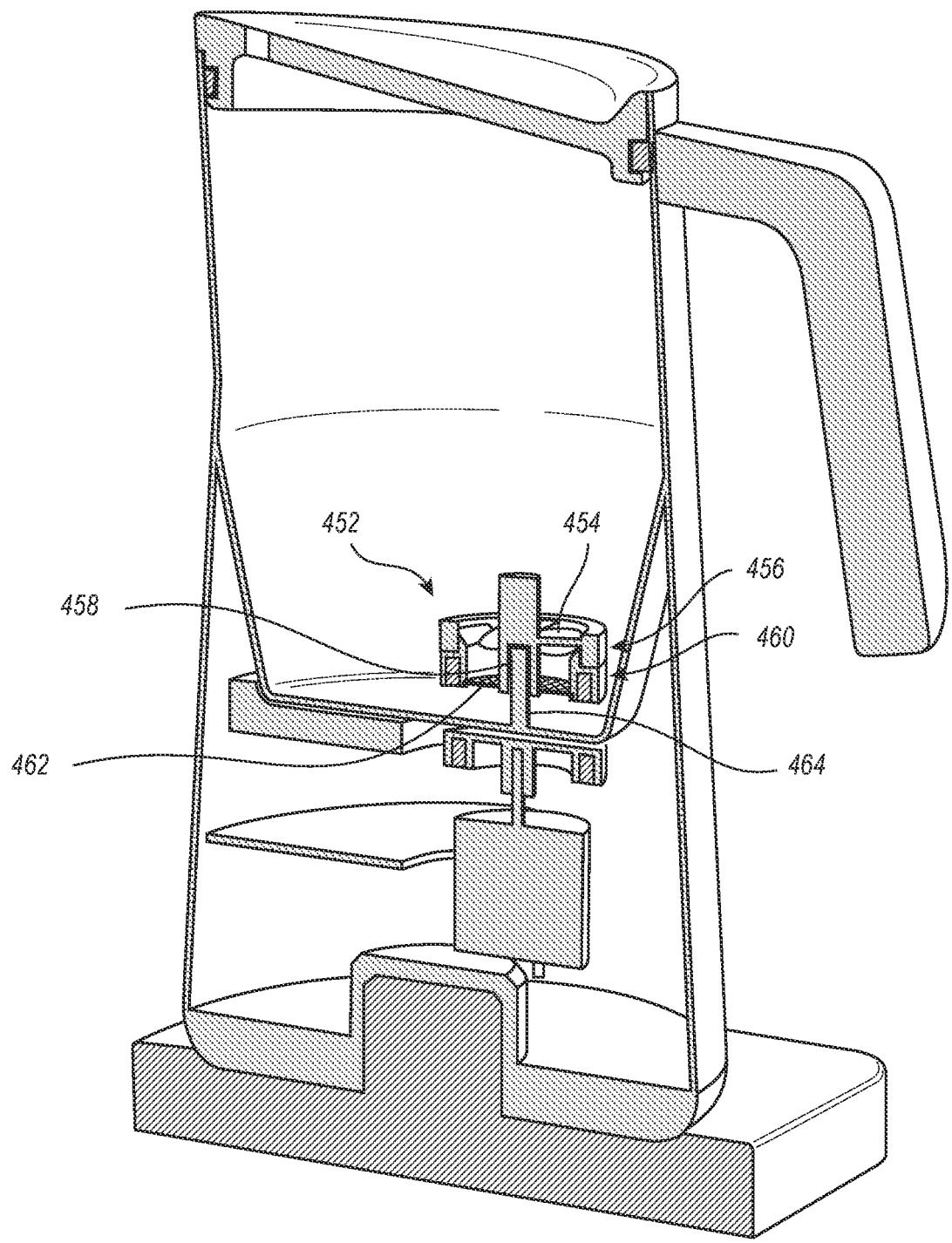
FIG. 14 is a perspective, sectional view of an alternative embodiment to that shown in FIG. 9.

The device 400 further includes a rotatable impeller 428 having blades 430 of varying dimensions and shapes depending on user preference, as discussed above in the context of FIGS. 1-4. The impeller 428 is disposed about a bottom end of a shaft 442 extending downward from lid 422. As seen in FIG. 10, the shaft 424, which is preferably a solid 4-5 mm rod, is fixed to the lid 422. The shaft 442 is fixed to the lid 422 in a position off-center from the middle of lid 422. The shaft 442 may also be fixed to an interior part of the body 406 rather than the lid 422. In another alternative to having the shaft 442 fixed to the lid 422 with a rotating impeller 418, the shaft 442 may be rotatably attached to the lid 422 to cause the impeller 428 to rotate. Or there may be no shaft 424 that hangs from the top of pitcher 402 but rather a rotatable shaft arrangement extending from the bottom wall 414, as seen in FIG. 14. With such arrangement, impeller 454 with its blades 454 and holder 456 is removably attachable to first ring 460 as discussed above. Holder 456 and first ring 460 with screen 462 are identical in all respects to holder 432, first ring 434, and screen 440 discussed above except for a channel 458 cut into holder 456 and first ring 434 and corresponding hole cut into screen 464 to permit a rotatable shaft 462 to be inserted into the channel 458 and hole in the screen. All other electrical and drive aspects of this embodiment are the same as that disclosed above in the context of FIGS. 9-13B.

Regardless of the specific structure of how the impeller 428 is designed to rotate within pitcher 402, the impeller 428 is capable of being rotated at various speeds and up to 7,000 RPM to achieve the desired microfoam. Such speeds are believed to be unique to any frothing device. Device 400 achieves such speeds through the use of a pair of magnetic rings with strong magnets with opposing polarities that create a massive bond between the rings to drive the impeller 428, as best seen in FIGS. 11A-13B.

To elaborate, these figures show shaft 442 extending downward from lid 422 offset from its center. The rotatable impeller 428 has blades 430 and a holder 432 disposed about the blades 430. The holder 432 has attachment means, such as a tongue and groove arrangement, for attaching the holder 432 to a first ring 434 directly beneath. The first ring 434 includes corresponding means for attaching the first ring 434 to the holder 432 such as tongue 436 extending from the inner wall of first ring 434. Such an attachment arrangement permits the first ring 434 to be detachable from the holder 432 for ease of cleaning the first ring 434 and replacement or substitution thereof. First ring 434 also includes a ring of magnets 438 contained therein. The magnets 438 are preferably arranged with pairs of positive polarities 438A disposed next to pairs of negative polarities 438B as seen in FIG. 13B. The electrical compartment 418 contains the corresponding second ring 448 disposed directly beneath the first ring 434 with the bottom wall 414 separating the two. Second ring 448 also contains magnets 450 with a combination of alternating positive and negative polarities 450A, 450B as best seen in FIG. 13B. This second ring 448 is driven by a high speed, variable motor 444 with shaft 446 in communication with both motor 440 and second ring 448, which in turn causes rotatable impeller 428 to rotate via the coupled first ring 434.

FIGS. 13A-13B also illustrate how impeller 428 has blades 430 and uses a screen 440 disposed about the impeller 428 in a downstream arrangement as discussed above. The screen 440 is contained by the first ring 434. The impeller 428 is configured to move fluid from the top to the bottom of the impeller 428, i.e., toward the screen 440 disposed under the impeller 428.

The motor 444 runs special programs that vary the speed of the impeller 428 for managing various phases of the foam-making, allowing the user to make different densities of microfoam. In particular, through extensive experimentation and testing, a structure and methodology has been discovered to create constant and repeatable results with device 400. First, as discussed above, the impeller 428 is correctly positioned off-center in device 400. If an impeller were positioned in the center of pitcher 402, microfoam would not be created because such impeller would very quickly create a full vortex and expose such impeller to the air. Doing so would only create big bubbles and would result in dry foam. Slowing such a centrally-positioned impeller down also would not work because it would spin too slowly to pull the big bubbles down. Second, the device 400 includes a tapered liquid compartment 416. Such a tapered aspect provides a rather significant advantage from a straight-edged configuration. In particular, the tapered aspect obviates the need to measure the quantity of fluid contained in the liquid compartment 416. Stated differently, a full vortex is more easily created with a small amount of milk that is dispersed evenly in straight-edged configuration. With the tapering, the milk pools in the middle of the liquid compartment 416. Thus, knowing the quantity of fluid contained therein is not key.

Moreover, as seen with device 400, when the impeller 428 is placed in its position offset from the center, it becomes possible to adjust the type of vortex created by adjusting the speed of the impeller 428. To elaborate, with reference to FIGS. 15A-15D, cold milk 466 is placed into the liquid compartment 416 and a program is selected by actuating the switch 424 until the indicator lighting shows the desired program to achieve the desired amount of foam. Regardless of the particular program selected, the general method of operation is the same.

Figure 15A:
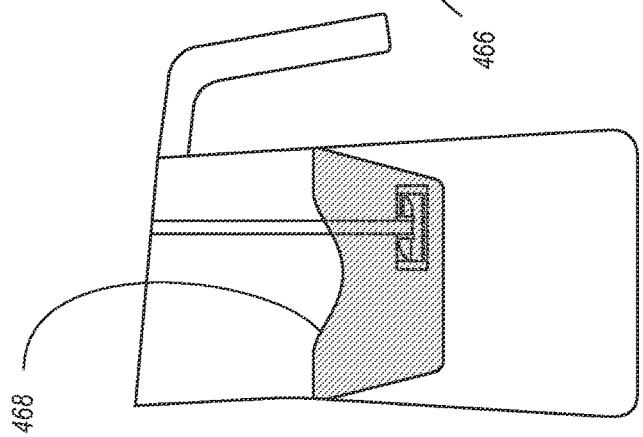
FIGS. 15A-15D schematically illustrate the device seen in FIG. 9 in operation.

As seen in FIG. 15A, stage one begins with the impeller 428 turning very slowly to churn the milk 466 while it warms up to the correct temperature of approximately 40° C. No bubbles are created during this stage.

Figure 15B:
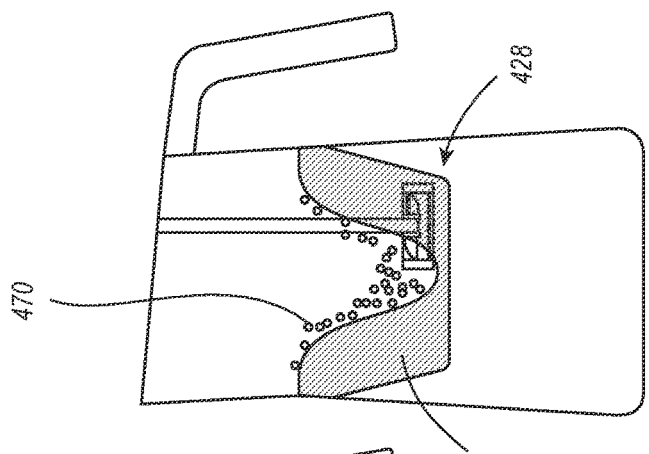

As seen in FIG. 15B, stage two begins with the impeller 428 speeding up to a very high speed. Doing so aggressively churns the milk 466 to create a deep vortex 468, exposing the impeller 428 to the air to create "normal" and/or big bubbles 470. This stage of the program may run as short as just three seconds or as long as twenty seconds depending on how much foam is desired.

Figure 15C:
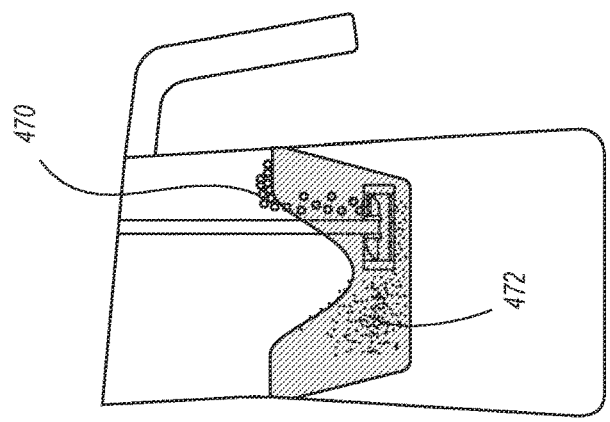

As seen in FIG. 15C, stage three begins with the impeller 428 slowing down from its very high speed. The impeller 428 slows down just enough to prevent the vortex 468 from reaching impeller 428. With the impeller 428 now fully submerged again, it can no longer make new bubbles. However, as the impeller 428 is offset from the center, the impeller 428 is still turning fast enough to pull the previously created bubbles down into the milk 466, through the impeller 428, and through the superfine mesh screen 440. Here, the bubbles 432 get smashed into microscopic bubbles that remain suspended in the milk and create a homogenous milk-foam substance or microfoam 472.

Figure 15D:
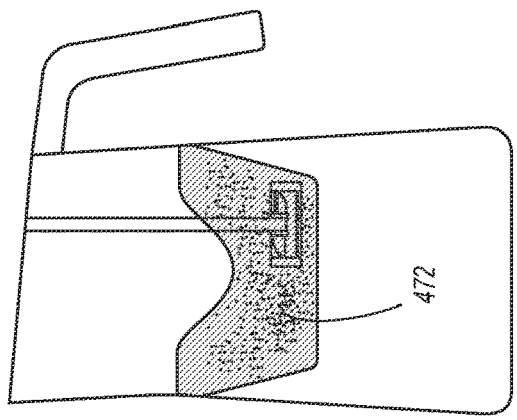

At the last stage as seen in FIG. 15D, all the bubbles 470 have been drawn down and turned into microfoam 472. The impeller 428 continues to churn at the same speed or gradually slows down until the milk reaches the desired final temperature of about 65° C. is reached. The device 400 then switches off.

One skilled in the art should now be able to glean quickly that the disclosed device 400 is capable of automatically heating milk and creating superfine microfoam milk. The resulting quality of the microfoam milk is indistinguishable from that prepared with an espresso machine steam wand. Yet, the user of device 400 need not have the skill of a professional barista knowledgeable about how best to adjust the position of the pitcher, milk, and steam wand during the process and to switch gradually from the aerating phase to a microfoaming phase. Device 400 therefore ameliorates the need to learn such skills and automates the entire process in a novel manner.

While certain embodiments have been described, the embodiments have been presented by way of example only and are not intended to limit the scope of the inventions. Indeed, the novel frothing devices and corresponding methods described herein may be embodied in a variety of other forms. Furthermore, various omissions, substitutions, and changes in the form of the disclosed elements may be made without departing from the spirit of the inventions. The accompanying claims and their equivalents are intended to cover such forms or modifications as would fall within the scope and spirit of the inventions.

The invention claimed is:

1. A frothing device comprising:
   a pitcher comprised of a body having a top and an opposing bottom and an inner bowl with a bottom wall disposed between the top and bottom of the pitcher body, wherein the inner bowl defines a liquid compartment and an electrical compartment;
   a lid disposed about the top of the pitcher body;
   a shaft extending downward from the lid in a position offset from a central location of the lid wherein the shaft has a top end and an opposing bottom end;
   an impeller disposed about the bottom end of the shaft wherein the impeller has blades and a holder disposed about the blades;
   a first ring disposed about the impeller opposite the shaft wherein the first ring includes a first set of magnets and a screen contained by the first ring;
   a second ring contained within the electrical compartment and disposed opposite the first ring, wherein the second ring includes a second set of magnets;
   a variable high speed motor for rotating the second ring at different rates of speed to rotate the impeller to create microfoam from milk poured into the liquid compartment of the pitcher; and
   a base for providing electricity to the pitcher and upon which the pitcher sits.

2. The frothing device of claim 1, wherein the first set of magnets includes pairs of positive polarity magnets disposed next to pairs of negative polarity magnets.

3. The frothing device of claim 2, wherein the second set of magnets includes pairs of positive polarity magnets disposed next to pairs of negative polarity magnets.

4. The frothing device of claim 1, wherein the inner bowl has tapered sides.

5. The frothing device of claim 1, wherein the base includes a heater.

6. The frothing device of claim 1, wherein the first ring is removably attachable to the holder.

7. The frothing device of claim 6, wherein the first ring is removably attachable to the holder via a tongue and groove arrangement.

8. A frothing device comprising:
  a pitcher having a liquid compartment and an electrical compartment;
  a rotatable impeller contained within the liquid compartment, wherein the impeller includes blades and a holder disposed about the blades;
  a first ring removably coupled to the impeller wherein the first ring has a first set of magnets of positive polarity and negative polarity and wherein the first ring further has a screen, wherein the screen is disposed adjacent to the electrical compartment; and
  a rotatable second ring contained within the electrical compartment and disposed opposite the first ring, wherein the second ring has a second set of magnets of positive and negative polarity.

9. The frothing device of claim 8, wherein the pitcher includes a generally cylindrical body and wherein the liquid compartment is defined by tapered side walls extending inward from the cylindrical body.

10. The frothing device of claim 9, wherein the rotatable impeller is disposed off-center within the body of the pitcher.

11. The frothing device of claim 9, wherein the impeller is capable of being rotated at various speeds and up to 5,000 RPM.

12. The frothing device of claim 11, further comprising a lid and a shaft fixed to the lid, wherein the impeller is disposed about one end of the shaft.

13. The frothing device of claim 11, further comprising a rotatable shaft disposed about a bottom of the liquid compartment, wherein the impeller is disposed about one end of the rotatable shaft.

14. The frothing device of claim 9, wherein the first ring is removably coupled to the impeller via a tongue and groove arrangement.

* * * * *